United States Patent [19]

Barber

[11] Patent Number: 4,620,118

[45] Date of Patent: Oct. 28, 1986

[54] DUAL PORT ACCESS CIRCUIT WITH AUTOMATIC ASYNCHRONOUS CONTENTION RESOLVING CAPABILITY

[75] Inventor: Frank E. Barber, Center Valley, Pa.

[73] Assignee: AT&T Bell Laboratories, Murray Hill, N.J.

[21] Appl. No.: 432,289

[22] Filed: Oct. 1, 1982

[51] Int. Cl.$^4$ .................. H03K 17/28; H03K 5/26
[52] U.S. Cl. .................. 307/518; 307/470; 307/514; 328/109; 364/200
[58] Field of Search .............. 364/200, 900; 307/247 R, 514, 526, 527, 518; 328/109, 110

[56] References Cited

U.S. PATENT DOCUMENTS

| | | | |
|---|---|---|---|
| 3,444,470 | 5/1969 | Bolt et al. | 307/518 |
| 3,813,604 | 5/1974 | Denoncourt | 307/527 |
| 4,164,787 | 8/1979 | Aranguren | 364/200 |
| 4,354,227 | 10/1982 | Hays, Jr. et al. | 364/200 |
| 4,355,354 | 10/1982 | Kempf et al. | 364/200 |
| 4,398,105 | 8/1983 | Keller | 307/514 |
| 4,415,972 | 11/1983 | Adcock | 364/200 |
| 4,422,142 | 12/1983 | Inaba et al. | 364/200 |
| 4,443,846 | 4/1984 | Adcock | 364/200 |

OTHER PUBLICATIONS

J. Nadir et al, "Dynamic-RAM-Controller Orchestrates Memory Systems," *Electronics*, Sep. 8, 1982, pp. 128-133.

S. Libes, *Fundamentals and Applications of Digital Logic Circuits*, 1975, pp. 102-105.

*Primary Examiner*—John S. Heyman
*Attorney, Agent, or Firm*—David I. Caplan

[57] ABSTRACT

Two microprocessors, which may be operating asynchronously, share a random access memory (RAM) array; that is, at any one moment of time, either microprocessor can seek access to the RAM but only one of them can actually gain access at a time. Priority of access to the RAM is controlled by a dual port contention-resolving access circuit which enables such access alternately to the two microprocessors when both are seeking (overlapping) access, subject to the stipulation when neither microprocessor is accessing the RAM that the very next access will be allocated by the circuit on a first-come first-served basis, and will be allocated to a preselected one of the microprocessors if both microprocessors will commence to seek access precisely at the same time.

32 Claims, 4 Drawing Figures

DUAL PORT ACCESS CIRCUIT WITH AUTOMATIC ASYNCHRONOUS CONTENTION RESOLVING CAPABILITY

FIELD OF THE INVENTION

This invention relates to integrated circuits, and more particularly to a contention resolving circuit for enabling dual port access to a target circuit by a pair of data processing machines which may be operated asynchronously and may transmit mutually conflicting access requests to the target circuit. For example, the contention resolving circuit can enable dual port access to a random access memory (RAM) array by a pair of asynchronously operated microprocessors.

BACKGROUND OF THE INVENTION

A data processing machine, such as a microprocessor, is a device for transforming input data (operands) into output data in accordance with operational instructions. Typically, a microprocessor takes the form of a semiconductor circuit which is integrated in a single crystal body ("chip") of semiconductive silicon. The input data or instructions or both typically are furnished to the microprocessor at least in part by one or more RAM arrays. Typically, each such RAM takes the form of a crosspoint array of memory elements. Each of the memory elements in the RAM can be accessed by the microprocessor during operation for the purpose of reading data from the RAM or writing data into the RAM. The RAM array is typically integrated in a single semiconductor body ("chip") which also includes a timing clock chain governing each cycle of internal operation of the RAM. The timing chain typically includes, for example, a clock for enabling properly timed address (access) to selected memory cells in the RAM and a clock for enabling data output from the RAM to be stored temporarily in data output registers, as known in the art.

In many practical applications, two separate microprocessors share a common RAM array, whereby both of the microprocessors can read or write the same RAM. However, the two microprocessors may operate at different rates asynchronously; that is, the timing of operations in one of the microprocessors is not correlated in any way with the timing in the other. Thus, one of the microprocessors can initiate a request for access to the RAM at the same time when the other is already accessing the RAM (or the other simultaneously initiates a request for access to the RAM); i.e., the microprocessors seek overlapping (or simultaneous) access. For proper operation, however, only one microprocessor can actually be allowed to gain access to the RAM at a time; otherwise confusion would result in the data supplied to (during writing) or from (during reading) the RAM from or to the microprocessors. Since, for example, it takes typically about 100 nanoseconds for one microprocessor to access a RAM, the probability of conflicting (overlapping or simultaneous) access requests is undesirably high; for example, in a situation where the RAM has an internal operating cycle time of about 100 nanoseconds while each microprocessor attempts access to the RAM once every 200 or 300 nanoseconds on the average, this probability of conflicting access requests can be as high as about 50 percent or more per access.

Accordingly, it is desirable to have an electrical circuit for enabling orderly access to a target circuit by a pair of data processing machines so that no access confusion results, that is, a circuit which enables access to the RAM by only one of the two data processing machines at a time by suitably resolving conflicting (whether overlapping or simultaneous) access requests.

In the prior art, orderly access to a RAM, for example, by two microprocessors (say MP-1 and MP-2) has been achieved by synchronizing the timing clocks of two microprocessors so as to operate the microprocessors at the timing rate of the slower of the two (say MP-2), and (temporarily) to halt operation of one of the microprocessors (MP-1 or MP-2) whenever the other of the microprocessors (MP-2 or MP-1) is accessing the RAM. Such an arrangement, however, undesirably slows down the operation of the originally faster microprocessor (MP-1), and/or undesirably requires excess logic elements to halt operation of one of the microprocessors (MP-1 or MP-2) while the other accesses the RAM.

It would therefore be desirable to have a circuit for enabling orderly access to a target circuit by a pair of data processing machines, but which does not require that the machines operate synchronously.

SUMMARY OF THE INVENTION

This invention involves a contention resolving circuit arrangement (e.g., 30), for producing a pair of contention-free ("chip enable") output signals (CE1, CE2) from a pair of conflicting affirmative access request ("chip select") signals (e.g., $CS1=0$ and $CS2=0$) seeking access to a target circuit (e.g., 50), the contention resolving circuit comprising: a main pair of cross-coupled triple-input combinational logic elements (e.g., NAND gates $G_1$ and $G_2$), each of which elements has an input terminal (e.g., $A_2$, $B_2$) connected to a separate bistable logic storage element (e.g., $FF_1$, $FF_2$) which delivers to the corresponding input terminal (e.g., $A_2$, $B_2$) a priority status signal ($Q1$, $Q2$) representative of the instantaneous priority of access to be allocated to the access request signals (e.g., $CS1=0$ and $CS2=0$).

A "bar" placed over a symbol for a signal denotes the binary opposite or complement of the signal: if a signal $S=1$, then $\bar{S}=0$, and if $S=0$, then $\bar{S}=1$. By "cross-coupled" logic elements is meant that one input terminal of each of the logic elements is connected to an output terminal of the other of the elements.

Typically each of the bistable logic elements ($FF_1$ and $FF_2$) is an R-S flip-flop device. The basic purpose of these bistable elements are: (1) to allow one and only one access per request, and (2) to enable alternate access in case of conflicting requests and thus aware priority of access.

Further, for resolving contention produced by simultaneously initiated affirmative access request signals ($CS1=0$; $CS2=0$), the contention resolving circuit also advantageously comprises: an auxiliary pair of cross-coupled triple input combinational logic elements (e.g., NAND gate $G_3$ and $G_4$), of significantly weaker output driving strengths than those of the main pair (e.g., $G_1$ and $G_2$), the output terminals of each logic element of the auxiliary pair being separately connected to the output terminal of the corresponding logic element of the main pair.

By "significantly weaker output driving strength" is meant, for example in transistor technology, that whereas the electrical current changes or impedance changes and hence voltage level shifts produced by each of the main NAND gates ($G_1$ and $G_2$) at its output terminal are sufficient to determine the ON vs. OFF condition of the corresponding cross-coupled input transistor of the other of the main NAND gates ($G_2$ and $G_1$), nevertheless the electrical current changes or impedance changes and hence voltage level shifts produced by each of the auxiliary NAND gates ($G_3$ and $G_4$) are not sufficient by themselves to affect the ON vs. OFF conditions of these cross-coupled input transistors (except for the case in which the main NAND gates tend to go into an intermediate state, as explained in greater detail below, in which case the auxiliary NAND gates have relatively small but still enough driving strengths to cause an imbalance and thus to determine the ON vs. OFF conditions of the cross-coupled input transistors in the main NAND gates). Conversely, the main NAND gates ($G_1$ and $G_2$) have significantly greater output driving strengths than those of the auxiliary NAND gates ($G_3$ and $G_4$).

For the purpose of suppressing an undesirable initial overlap which otherwise results in output of the contention resolving circuit in case of simultaneous access request, the contention resolving circuit further comprises a pair of cross-coupled gating elements (e.g., M535 and M536) each of whose controlled paths is separately connected between the output terminal of a separate one of the main NAND gates (e.g., $G_1$, $G_2$) and a pair of load elements (e.g., M533, M534). By "controlled path" is meant, for example, the source-drain path of an MOS (Metal Oxide Semiconductor) transistor.

In a specific embodiment of the invention, the target circuit has a characteristic internal operating cycle time for each access thereto, and the access request signals originate from a pair of asynchronously operated data processing machines (MP-1, MP-2). At the end of every internal cycle, the target circuit generates a (complementary) end-of-cycle signal (EOC=0) of relatively narrow pulse width. Each of the bistable logic storage elements (e.g., $FF_1$, $FF_2$) in the contention resolving circuit (e.g., 30) is an R-S flip-flop element; and each of these flip-flops ($FF_1$, $FF_2$) is reset (i.e., $Q1=1$, $Q2=1$) by an affirmative delayed complementary access signal (CS1D=1, CS2D=1) representative of termination of the corresponding access request signal (CS1=0, CS2=0); whereas each of the flip-flops ($FF_1$, $FF_2$) is set (i.e., $Q1=0$, $Q2=0$) by an output signal from a separate NOR gate ($G_5$, $G_6$) having one of its input terminals controlled by the (complementary) end-of-cycle signal (EOC) from the target circuit and the other of its input terminals controlled by a delayed contention-resolved signal (CE1PD=0, CE2PD=0) representative of the respective access request signal (CS1=0, CS2=0). Illustratively, the target circuit comprises a RAM array and the data processing machines comprise microprocessors.

In the absence of any access request from either data processing machine, both R-S flip-flops ($FF_1$ and $FF_2$) are reset ($Q1=Q2=1$) by the delayed complementary access request signals (CS1D=CS2D=1), so that both flip-flops ($FF_1$ and $FF_2$) furnish HIGH (enabling) logic level priority status signals ($Q1=Q2=1$) to the main NAND gates ($G_1$ and $G_2$). The one main NAND gate (say $G_1$) which receives the first (in time) occurring access request signal (say CS1=1) then becomes enabled (its output becomes LOW); thereby a desired access enabling output signal (say CE1=1) is produced, while the other main NAND gate (say $G_2$) remains disabled. In response to the desired access enabling output signal (say CE1=1), the target circuit performs and completes a cycle within a prescribed time interval and then sends the (complementary) end-of-cycle signal (EOC=0) to a pair of NOR gates ($G_5$ and $G_6$), only one of which (say $G_5$) is thereby enabled, namely that one NOR gate (say $G_5$) which is supplied with the delayed contention resolved signal (say CE1PD=0) derived from the output signal of the selectively enabled NAND gate (say $G_1$). Consequently, the enabled NOR gate (say $G_5$) sets the corresponding one flip-flop (say $FF_1$) whose output is the one priority status signal (say Q1) which is supplied to the one (enabled) NAND gate (say $G_1$). As a result, the one priority status signal (say Q1) supplied by the one flip-flop (say $FF_1$) is set ($Q1=0$) and shifts priority status away from (and disables) the one main NAND gate (say $G_1$) and continues to disable it—and thus continues to afford priority of access to the other access request signal (say CS2)—until this one flip-flop (say $FF_1$) is again reset (say $Q1=1$) by termination (CS1=0) of the first occurring access request signal. To handle the cases, if any, of simultaneous initiation of access requests by both input signals (CS1=CS2=1), which can cause an undesired intermediate or "indeterminate" state of the cross-coupled main NAND gates ($G_1$ and $G_2$), a pair of cross-coupled auxiliary NAND gates ($G_3$ and $G_4$) can be added for imbalancing the main NAND gates ($G_1$ and $G_2$) so as to take them out of the indeterminate state and to produce first (in time) enabling of a preselected one of the main NAND gates ($G_1$) and hence to produce first (in time) access to the target circuit by the corresponding one (MP-1) of the data processing machines followed by access to the target circuit by the other (MP-2) of the data processing machines.

BRIEF DESCRIPTION OF THE DRAWING

This invention together with its advantages and features can be better understood from the following detailed description when read in conjunction with the drawing in which.

DETAILED DESCRIPTION

Figure 1:
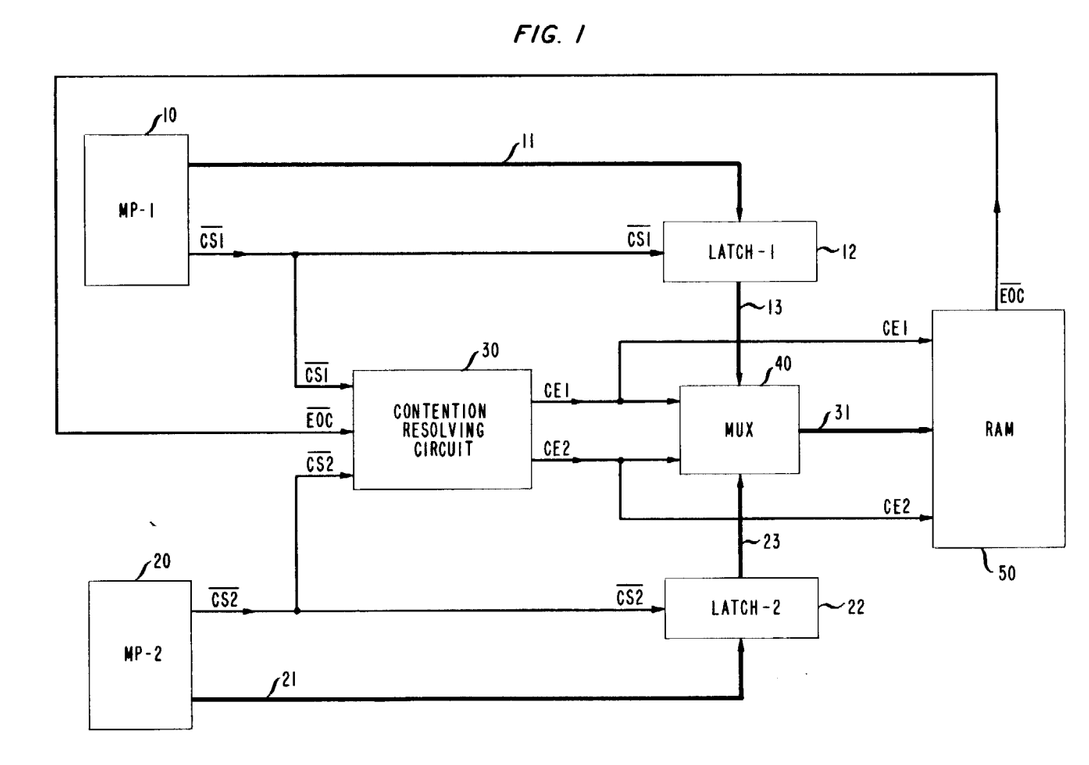
FIG. 1 is a system diagram showing a random access memory accessed by a pair of microprocessors through a contention resolving circuit.

As shown in FIG. 1, each of first and second microprocessor 10 and 20 (also designated MP-1 and MP-2) is provided with access to a RAM 50 (including its timing clock chain) through a multiplexer (switch) 40 (also denoted by MUX) controlled by a contention resolving circuit 30. The first microprocessor 10 sends its RAM address data (and input data, if desired for writing), for reading (or else writing, if so desired) the RAM, through a first input data bus path 11 to a first input latch 12 (also denoted by LATCH-1); the second microprocessor 20 sends its memory address data (and input data, if any), for reading (or writing, if desired) the same RAM, through a second input data bus path 21 to a second input latch 22 (also denoted by LATCH-2). Latching of data from path 11 into the LATCH-1 is enabled by a first complementary "chip select" signal CS1=0 from the first microprocessor MP-1 to the LATCH-1. In this way, when CS1=0, the data from MP-1 is latched into LATCH-1; and similarly, when CS2=0, the data from MP-2 through the second path 21 is latched into LATCH-2. The binary "0" (or LOW) level of the signals CS1 and CS2 thus constitute positive (affirmative) requests for access to the RAM by the microprocessors MP-1 and MP-2, respectively. However, in general, these requests can conflict, i.e., overlap (CS1=CS2=0, simultaneously); and thus these requests are to be resolved by the contention resolving circuit 30, as described more fully below, into a pair of contention-free "chip enable" signals CE1 and CE2 which never overlap in their HIGH states (CE1=1, CE2=1).

The first latch 12 (LATCH-1) delivers its latched data to the MUX 40 through a third input data path 13, while the second latch 22 (LATCH-2) delivers its latched data to the same MUX through a fourth input data bus path 23. At any moment of time, the MUX delivers to the RAM through a fifth input data bus path 31 only the data from but one of these latches 12 and 22, depending upon the binary signal levels of a pair of contention resolved (contention-free) chip enable control signals CE1 and CE2. More specifically, when the signal level of CE1 is binary "1" (or HIGH) and hence CE2 is binary "0" (or LOW), then the MUX delivers only the data from LATCH-1 into the RAM; conversely, when CE2 is HIGH and hence CE1 is LOW, then the MUX delivers only the data from LATCH-2 into the RAM.

At the end of each internal RAM cycle, whether set in motion by CE1 or CE2 the RAM delivers a complementary end-of-cycle signal E0C=0 (E0C is LOW) to the contention resolving circuit 30. Normally E0C=1; and only at the end of a RAM cycle, E0C=0 for a short interval of time. The complementary signal E0C=0 thus advantageously has the wave form of a negative pulse (spike) going to zero for an extremely short duration of time. The short pulsed signal E0C=0 serves a contention resolving purpose described below. It should be understood that each of the data paths 11, 21, and 31 also includes a read vs. write (R/W̄) enable signal line, which is HIGH for a desired RAM read-out operation cycle, and which is LOW for a desired RAM write-in operation cycle. Also, for the read-out operation, it should be understood that the output data flow from the RAM to the microprocessors at the end of the cycle is along an output data bus path (not shown) from the RAM to the MUX (a separate portion of the MUX from that used for the previously described input data flow), and then along output data bus paths (not shown) from the MUX through suitable output data latches (not shown) and finally along the data path 11 or 21 to the appropriate microprocessor MP-1 or MP-2.

In an illustrative example, N-MOS technology with 2.8 micron design rules is used. The commencement of each new affirmative access request (CS1=0 or CS2=0) by each of the microprocessors is spaced in time from the commencement of the immediately previous request from that same microprocessor by at least about 270 ns (nanoseconds); whereas the time it takes for the timing-clock chain of the RAM, once set in motion by a HIGH level of chip enable signal (CE1 or CE2) from either of the microprocessors, to complete its internal RAM cycle is about 100 ns. The duration of each affirmative request signal (CS1=0 or CS2=0) is illustratively at least 200 ns (twice the RAM cycle) in order to ensure proper response by the RAM to simultaneous MP-1 and MP-2 requests, i.e., commencement of chip select signals CS1=0 and CS2=0 at substantially the same moment of time. On the other hand, since the rise time plus fall time of input chip select signals (CS1, CS2) is about 10 ns, and since it takes about 60 ns to precharge any one of the latches 12 and 13, therefore the total time between commencement of successive requests from the same microprocessor is advantageously about 270 ns (=100+100+60+10 ns). The pulse width of the signal E0C=0 is typically about 15 ns or less.

Figure 2:
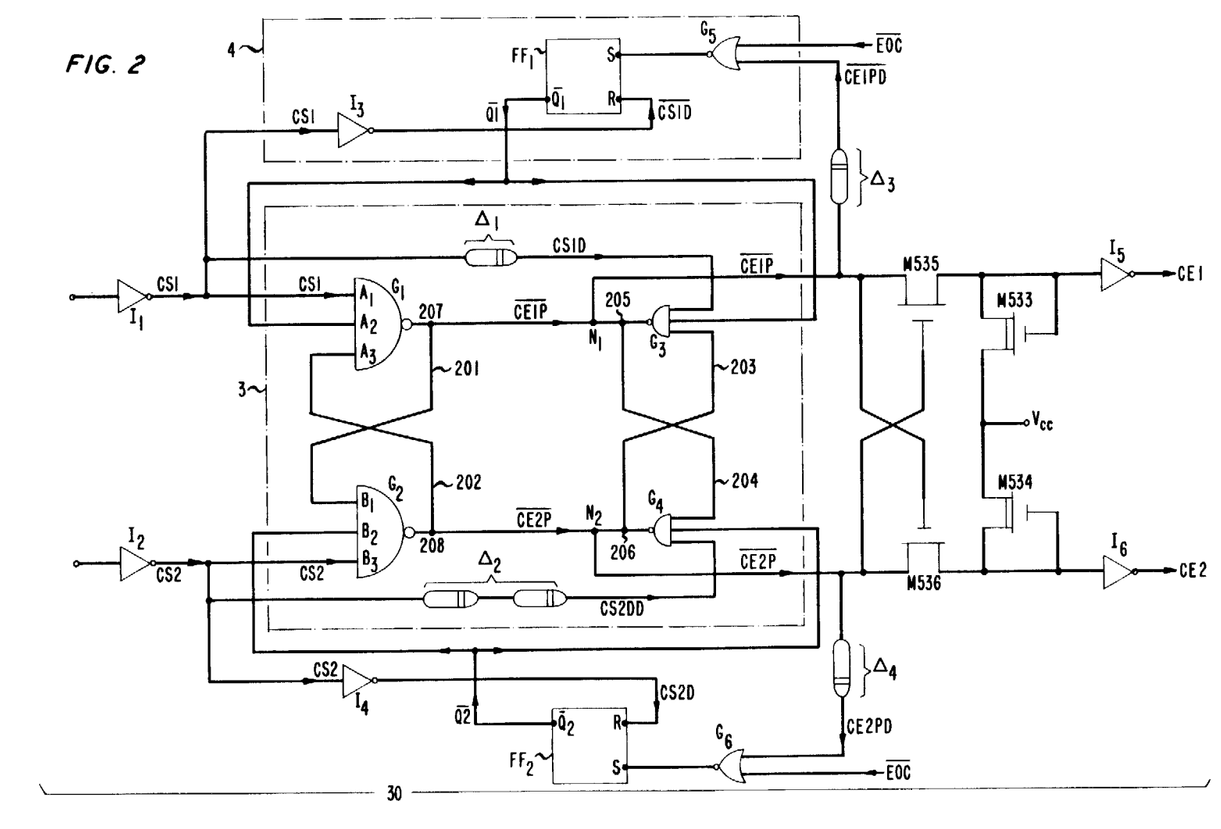
FIG. 2 is a logic diagram of a contention resolving circuit in accordance with a specific embodiment of the invention.

FIG. 2 shows a contention resolving circuit 30 of binary logic elements (responsive to logic HIGH vs. LOW input signal levels) for resolving conflicts between the input signals CS1 and CS2 in accordance with the invention. The output of the circuit 30 is the desired contention-free pair of output signals CE1 and CE2. More specifically, contention produced by overlapping input signals CS1=CS2=0 is resolved by nonoverlapping output signals CE1=1 and CE2=1 in an orderly sequence, as described more fully below.

The circuit 30 includes multiple input NAND gates $G_1$, $G_2$, $G_3$, and $G_4$, together with R-S flip-flop storage elements $FF_1$ and $FF_2$, NOR gates $G_5$ and $G_6$, each with two input terminals, delay elements $\Delta_1$, $\Delta_2$, $\Delta_3$, and $\Delta_4$, together with inverter elements $I_1$, $I_2$, ... $I_6$, as well as transistor loads M533 and M534, and transistor gate elements M535 and M536. The NAND gates $G_1$ and $G_2$ are substantially identical, and the NAND gates $G_3$ and $G_4$ are substantially identical, but the output driving or influencing strength of each of the ("main") NAND gates $G_1$ and $G_2$ is significantly greater than that of each of the ("auxiliary") NAND gates $G_3$ and $G_4$. Each delay element is typically formed by an even number of inverters connected in series. The corresponding delays $\Delta_3$ and $\Delta_4$ are substantially equal, whereas $\Delta_1$ and $\Delta_2$ differ by more than the response time of the main NAND gates $G_1$ and $G_2$ (that is, the time it takes for the outputs of these gates to change in response to changes in their inputs).

The NAND gates $G_1$ and $G_2$ are cross-coupled by means of cross-coupling interconnections 201 and 202; the NAND gates $G_3$ and $G_4$, by cross-coupling interconnections 203 and 204. Except for the delay $\Delta_2$, in the lower half of FIG. 2, as opposed to the shorter delay $\Delta_1$ in the upper half, i.e., $\Delta_1 < \Delta_2$, the arrangement 30 is substantially symmetrical about its horizontal mid-axis. Accordingly, the functioning of the elements depicted in the top half of FIG. 2 will be described briefly in detail with the understanding that the bottom half functions similarly.

During operation, the complementary chip select signal CS1 (from MP-1 in FIG. 1) is inverted by the inverter $I_1$ to form the chip select signal CS1 which is applied at input terminal $A_1$ of the NAND gate $G_1$. The output at output terminal 207 of this NAND gate $G_1$ is delivered to a first node $N_1$ while the output at output terminal 205 of the NAND gate $G_3$ is also delivered to this node $N_1$. The node $N_1$ is connected both to an input terminal of the third delay element $\Delta_3$ and to a high current carrying (controlled) terminal (drain or source) of transistor gate M535 and to a low current carrying (control) terminal (gate electrode) of transistor gate M536. The signal developed at the node $N_1$ is denoted by CE1P, signifying a modified (primed) complement of the desired output chip enable signal CE1. After passing through the third delay element $\Delta_3$, the primed signal CE1P is transformed into a first delayed primed complementary signal CE1PD; that is, the signal CE1PD is delayed relative to the signal CE1P by an amount of time, typically at least 20 ns, which is in any event advantageously greater than the pulse width of the logic LOW level of the complementary end-of-cycle signal EOC (which signifies the end of each internal RAM cycle). This signals EOC and CE1PD both enter as inputs to the NOR gate $G_5$ whose output is delivered as input to a set terminal S of the flip-flop $FF_1$. A reset terminal R of this flip-flop $FF_1$ is connected so as to receive a delayed complementary chip select signal CS1D via the connecting path through inverters $I_1$ and $I_3$.

In the upper half of FIG. 2, the output of the first delay element $\Delta_1$ is denoted by CS1D, signifying a delayed chip select signal from MP-1 (FIG. 1); whereas in the lower half of FIG. 2, the output of the second delay element $\Delta_2$ (comprising, for example, two equal delay elements each equal to $\Delta_1$) is denoted by CS2DD, signifying a doubly delayed (by the two delay elements of $\Delta_2$) chip select signal from MP-2 (FIG. 1).

A logic HIGH level of signal (from the NOR gate $G_5$) delivered to the "set" terminal S in the flip-flop $FF_1$ causes its output Q1 at its output terminal $Q_1$ to latch into the logic LOW level (Q1=0); whereas a HIGH level of input signal (from the inverter $I_3$) delivered to the "reset" terminal R in the flip-flop $FF_1$ causes its output Q1 to latch into its HIGH level (Q1=1).

The basic purpose of the flip-flop $FF_1$—when its output signal Q1=0 is delivered to the middle input terminal $A_2$ of the first NAND gate $G_1$—is to shift RAM access priority away from the first microprocessor MP-1. Thus the condition Q1=0 while Q2=1 causes priority of access to be in favor of MP-2; whereas there is no priority of access when Q1=Q2, as described below in more detail. The basic purpose of the first NAND gate $G_1$ is to enable RAM access by the first microprocessor MP-1 (when CS1=0) provided there is then no conflict due to overlap with an earlier commenced affirmative RAM access request (CS2=0) from the second microprocessor of MP-2. The basic purpose of the NAND gates $G_3$ (and $G_4$)—together with the delay $\Delta_1$ and the longer delay $\Delta_2$—is to ensure proper operation of the circuit 30 if and when access requests are commenced by MP-1 and MP-2 essentially simultaneously (and the cross-coupled NAND gates $G_1$ and $G_2$ would or might otherwise go into an indeterminate state). The basic purpose of the transistor M533 through M536 is to prevent undesirable overlapping HIGH levels of chip enable signals CE1 and CE2 which would or might otherwise occur during simultaneously commenced access requests from both microprocessors. The basic purpose of the (longer) delay element $\Delta_2$ is to accord priority of access to MP-1 if and when MP-2 commenced an access request at substantially the same moment of time as does MP-1, i.e., both CS1 and CS2 go to a LOW level essentially simultaneously. Finally, the basic purpose of the (shorter) first delay element $\Delta_1$ (as opposed to a direct connection) is to provide substantially identical impedances to the input chip select signals CS1 and CS2, as is important when access requests are commenced by MP-1 and MP-2 substantially simultaneously.

In order to gain an understanding of the operation of the arrangement 30, it is useful to consider as a first case that in which the first microprocessor MP-1 (FIG. 1) seeks access to the RAM in the complete absence of any conflicting (either overlapping or simultaneously commenced) access request from the second microprocessor MP-2. Accordingly, the first case involves the commencement of a LOW level of the first complementary chip select signal, CS1=0, while the second complementary chip select signal CS2 remains HIGH, CS2=1. For further simplicity, the first case being described entails the situation in which the output of the $\overline{Q}_1$ terminal of the first flip-flop $FF_1$ is HIGH, i.e., the status signal Q1=1. Thus the middle input terminal $A_2$ of the first NAND gate $G_1$ is furnished with a HIGH level of the status signal Q1. Moreover, after passage of CS1=0 through the first inverter $I_1$, the input to the top input terminal $A_1$ of the first NAND gate $G_1$ thus becomes HIGH, i.e., CS1=1. Accordingly, the two upper input terminals $A_1$ and $A_2$ of the NAND gate $G_1$ are thus both HIGH. Since CS2 at this time is HIGH and hence $\overline{CS2}$ is LOW (because MP-2 is assumed not to be seeking access), the output CE2P of the second NAND gate $G_2$ is HIGH, and this output CE2P is delivered to the bottom input terminal $A_3$ of the first NAND gate $G_1$ through the cross-coupling interconnection 202. Accordingly, all three inputs to the first NAND gate $G_1$ are HIGH, so that the output of this first NAND gate drives the node $N_1$ to a LOW level regardless of the output of the third NAND gate $G_3$ owing to the greater output driving strength of $G_1$ as compared with that of $G_3$. Accordingly the first primed chip enable signal CE1P goes LOW and delivers a LOW level of signal to the gate electrode of M536, to the high current path (source-drain) of transistor M535, as well as to the top input terminal of the second NAND gate $G_2$ (via cross-coupling interconnection 201). Correspondingly, therefore, transistor M536 is turned OFF, so that the second output chip enable signal CE2 from the sixth inverter $I_6$ remains LOW since the input to the sixth inverter $I_6$ remains HIGH because of the load M534 connected to the source of HIGH voltage level $V_{CC}$; whereas the output signal CE2P of the second NOR gate $G_2$ is HIGH, hence the transistor M535 is ON, and the LOW level signal of CE1P is delivered through M535 to the fifth inverter $I_5$. Accordingly, the first output chip enable signal CE1 from this fifth inverter $I_5$ goes HIGH, so that the first output chip enable signal CE1 thus goes HIGH while the second output chip enable signal CE2 stays LOW, as desired for access to the RAM by the first microprocessor MP-1.

Meanwhile, because of the logic properties of a NAND gate such as the second NAND gate $G_2$, the output CE2P of this second NAND gate $G_2$ cannot change from HIGH to LOW so long as the output CE1P of the first NAND gate $G_1$, delivered as input to the second NAND gate $G_2$ via the interconnection 201, remains LOW. But the output CE1P of $G_1$ remains LOW until either CS1 as delivered at the input terminal $A_1$ of the first NAND gate $G_1$ goes LOW (CS1 goes HIGH) or Q1 as delivered at the input terminal $A_2$ thereof goes LOW; that is, until either the first microprocessor MP-1 ceases its access request or the first flip-flop $FF_1$ is set (Q1=0) by a HIGH signal delivered at its set terminal S from the NOR gate $G_5$. In turn, such a HIGH signal from the NOR gate $G_5$ requires an earlier LOW level of the complementary end-of-cycle signal, EOC=0, with a simultaneously earlier LOW level of signal from the third delay element $\Delta_3$, CE1PD=0. In turn, this LOW level of signal CE1PD requires a LOW level of CE1P from the first node $N_1$ about 20 ns or more earlier (i.e., the delay time of $\Delta_3$). Such setting of $Q1=0$ thus occurs after a RAM cycle in which MP-1 successfully accessed the RAM; i.e., the setting of $Q1=0$ occurs immediately at the end of this RAM cycle corresponding to a cycle initiated (when $Q1=1$ and $CS1=0$) by the first microprocessor. Thus, for proper setting of $Q1=0$ so as to yield priority of access to MP-2, the duration of $CS1=0$ is at least as long as the RAM cycle time (and is advantageously still longer), to accommodate the situation where MP-1 commences to seek access at a time when MP-2 is clearly accessing the RAM. At the end of such a RAM cycle, the complementary end-of-cycle signal $EOC=0$ thus causes the NOR gate $G_5$ to set the first flip-flop $FF_1$ to $Q1=0$, whereby the input to the top terminal $B_1$ of the second NAND gate $G_2$ goes HIGH because the output of the first NAND gate $G_1$ goes HIGH due to $Q1=0$, and hence priority of access to the RAM is yielded by the first microprocessor MP-1 to the second microprocessor MP-2. Thus, if at the moment when the first flip-flop $FF_1$ is set to $Q1=0$ by the NOR gate $G_5$ at the end of the cycle ($EOC=0$) the second microprocessor MP-2 is and has been requesting access to the RAM and hence the second flip-flop $FF_2$ is or has been reset ($CS2=0$, $CS2=1$, $CS2D=0$, and hence $Q2=1$), then the second chip enable signal CE2 will go HIGH in much the same way as previously described for the resulting HIGH level of the first chip enable signal CE1.

In any event, soon after MP-1 ceases to request access (i.e., soon after CS1 goes HIGH) the first flip-flop $FF_1$ will be reset to $Q1=1$ as follows: (1) the first inverter $I_1$ delivers a LOW level signal ($CS1=0$) to the third inverter $I_3$, (2) the output CS1D of this third inverter $I_3$ then goes HIGH and is delivered to the reset terminal R of the first flip-flop $FF_1$, while at this same moment of time the signal being delivered to the set terminal S of $FF_1$ is (or will soon be) LOW since then the NOR gate $G_5$ delivers a LOW level signal to the set terminal S of the first flip-flop $FF_1$ because the signal CE1PD then being delivered to the NOR gate $G_5$ is (or will soon be after at most a delay $\Delta_3$) at a HIGH level, and hence (3) the flip-flop $FF_1$ is (or will soon be) thus reset to $Q1=1$. It should be noted that the output CS1 and CS2 of the first and second inverter $I_1$ and $I_2$, respectively, will be delayed as well as inverted with respect to the inputs CS1 and CS2, but the resulting delays are not utilized until further delays by the inverter $I_3$ and $I_4$ form the delayed signals CS1D and CS2D, respectively.

On the other hand, after the signal EO $C=0$ has set the first flip-flop $FF_1$ to $Q1=0$, this flip-flop will not be reset to $Q1=1$ until the first microprocessor MP-1 ceases to seek access, i.e., until $CS1=1$. In this way, the first flip-flop prevents undesired multiple access by a single access request ($CS1=0$), and thus allows a single access request $CS1=0$ to continue for as long as desired without causing any undesired fluctuations or "glitches" in the target RAM data output.

In case the starting point is $Q1=Q2=1$, then simultaneous fresh affirmative access requests $CS1=0$ and $CS2=0$, respectively, from MP-1 and MP-2 may or will result in an undesirable intermediate (or "indeterminate") state of the cross-coupled NAND gates $G_1$ and $G_2$, as both NAND gates immediately earlier were, and hence presently are, characterized by HIGH levels of outputs (caused by earlier $CS1=1$ and $CS2=1$) which outputs were and still are being cross-coupled as HIGH inputs to each other through cross-couplings 201 and 202, as well as by the HIGH levels of input Q1 to $A_2$ and Q2 to $B_2$, CS1 to $A_1$ and CS2 to $B_1$. The three HIGH inputs to each of the first and second NAND gates $G_1$ and $G_2$ thus produce an indeterminacy as (1) both of these gates start to lower their own outputs to the LOW level due to triple HIGH inputs, and hence (2) each of these NAND gates tends to cross-couple a LOW input to the other through the cross-coupling connections 201 and 202, and hence (3) each of these gates tends to drive the output of the other back towards the HIGH level and hence (4) the inputs to both NAND gates tends to the triple HIGH level again, thereby repeating the initial tendency of LOW level outputs. The result can be an undesirable intermediate voltage level at nodes $N_1$ and $N_2$ due to the outputs of the NAND gates $G_1$ and $G_2$, sufficient to produce an ambiguity of access from MP-1 and MP-2 to the RAM through the contention circuit 30 which would otherwise occur were it not for the presence of the third and fourth NAND gates $G_3$ and $G_4$ operating in conjunction with the differing first and second delay elements $\Delta_1$ and $\Delta_2$, as described more fully below.

For definiteness, the first time delay element is designed to produce a first delay $\Delta_1$ which is less than that of the delay $\Delta_2$ through the second delay element; i.e., $\Delta_1 < \Delta_2$. Accordingly, the top terminal of the NAND gate $G_3$ receives a HIGH level of signal ($CS1D=1$) from the first delay element $\Delta_1$ before the NAND gate $G_4$ receives a HIGH level of signal ($CS1DD=1$) from the second delay element $\Delta_2$. Accordingly, although $Q2=1$ the output of the NAND gate $G_4$ cannot, for a short time interval equal to ($\Delta_2 - \Delta_1$), go LOW; but since $Q1=1$, the output of the NAND gate $G_3$ can and does go LOW during this same time interval ($\Delta_2 - \Delta_1$). Thus, the NAND gate $G_3$ drives the first node $N_1$ out of the intermediate state into the LOW level state $N_1=0$ while the NAND gate $G_4$ drives the node $N_2$ into the HIGH level state $N_2=1$. Although the driving forces of both these NAND gates $G_3$ and $G_4$ are weak as compared with those of the NAND gates $G_1$ and $G_2$; nevertheless, because of the indeterminate state of these NAND gates $G_1$ and $G_2$, these weak driving forces of $G_3$ and $G_4$ are still sufficient to bring about the NAND gate state $N_1=0$, $N_2=1$ and to maintain that state because the cross-coupling interconnections 201 and 202 of the more powerful NAND gates $G_1$ and $G_2$ then drive these more powerful NAND gates into the corresponding determinate state. In particular, all three inputs to the first NAND gate $G_1$ are at the HIGH level as soon as the output of the third NAND gate $G_3$ goes LOW and drives the output of the second NAND gate $G_2$ to the HIGH level which is cross-coupled via interconnection 202 as input to the first NAND gate $G_1$. Even after the output of the fourth NAND gate $G_4$ goes LOW a time interval ($\Delta_2 - \Delta_1$) later on, the nodes $N_1$ and $N_2$ remain in the state $N_1=0$, $N_2=1$ (thereby producing output chip enable signals $CE1=1$, $CE2=0$ as described more fully below), because only the third NAND gate $G_3$ has all three of its inputs at the HIGH level (until still later on at the end of the RAM cycle when the first flip-flop $FF_1$ is set by a complementary end-of-cycle signal $EOC=0$ to the NOR gate $G_5$, at which time Q1 goes LOW and the NAND gate state $N=0$, $N_2=1$ can only then be changed). Thus, priority of access is in favor of MP-1 in the case of simultaneous access requests from MP-1 and MP-2 at a time when $Q1=Q2=1$.

In cases of simultaneous initiation of affirmative access CS1=CS2=0 at a time when Q1=Q2=1, an undesirable tendency for overlap of affirmative chip enable signals CE1=CE2=1 could or would occur during a short time interval when the main NAND gates $G_1$ and $G_2$ are in the indeterminate state, but this undesirable tendency is suppressed by the presence of transistors M535 and M536 operating in conjunction with transistor loads M533 and M534. More specifically, the indeterminate level can persist typically for about 3 or 4 ns during which both nodes $N_1$ and $N_2$ are sufficiently low in voltage level to produce simultaneously high (affirmative) chip enable signals CE1=CE2=1 in the absence of transistors M535 and M536, i.e., in the presence of direct ohmic connection of nodes $N_1$ and $N_2$ to the inverters $I_5$ and $I_6$. This undesirable overlap is suppressed by transistors M533-M536 as follows: (1) upon commencement of the indeterminate level of nodes $N_1$ and $N_2$, the levels of signals CE1P and CE2P are thus pulled from the HIGH level to a somewhat low common voltage level. This common voltage level immediately turns OFF both transistors M535 and M536 because both these transistors have gate to source voltages of substantially zero, while the inputs to both inverters $I_5$ and $I_6$, respectively, remain HIGH due to the presence of the loads M533 and M534, respectively, connected to a common source of HIGH level of voltage $V_{CC}$. Accordingly, the chip enable signals CE1 and CE2 remain LOW until the indeterminate state of the main NAND gates $G_1$ and $G_2$ is resolved by differently delayed signals from the auxiliary NAND gates $G_3$ and $G_4$. Specifically, since the delay $\Delta_1$ is less than $\Delta_2$, the output of NAND gate $G_3$ goes LOW before the output of NAND gate $G_4$ can do so. Hence, as soon as contention is thus resolved, the first node $N_1$ (and hence CS1P) goes LOW and the second node $N_2$ (and hence CS2P) goes HIGH. In turn, the transistor M536 remains OFF, but the transistor M535 is turned ON as soon as the voltage difference between nodes $N_1$ and $N_2$ becomes equal to at least a (low) threshold voltage of this transistor M535; thereby the input to the sixth invert $I_6$ remains HIGH (due to load M534), but the input to the fifth inverter goes LOW (due to the turning ON of M535 and the passage of LOW signal level of CE1P from the first node $N_1$ through the source-drain path of transistor M535).

In summary, the transistors M533-536 operate to prevent the output CE1 and CE2 of the inverters $I_5$ and $I_6$ from simultaneously being HIGH, even if both CE1P and CE2P are simultaneously LOW. Only when CE1P and CE2P differ by at least the (low) voltage threshold of transistor M535 (and M536) can either CE1 or CE2 go HIGH.

In the illustrative example, the time delay $\Delta_1$ is made equal to about 4 ns, and the delay $\Delta_2$ about 8 ns. In any event, the difference ($\Delta_2 - \Delta_1$) is at least about 3 or 4 ns, i.e., somewhat greater than the response time of the main NAND gates $G_1$ and $G_2$. The mutually equal delays $\Delta_3$ and $\Delta_4$ are both about 20 ns, since the pulse width of EO C=0 can be as large as about 15 ns and should be less than that of $\Delta_3 = \Delta_4$. Moreover, the voltage source $V_{CC}$ is typically about +5 volts and the source $V_{SS}=0$.

Figure 3:
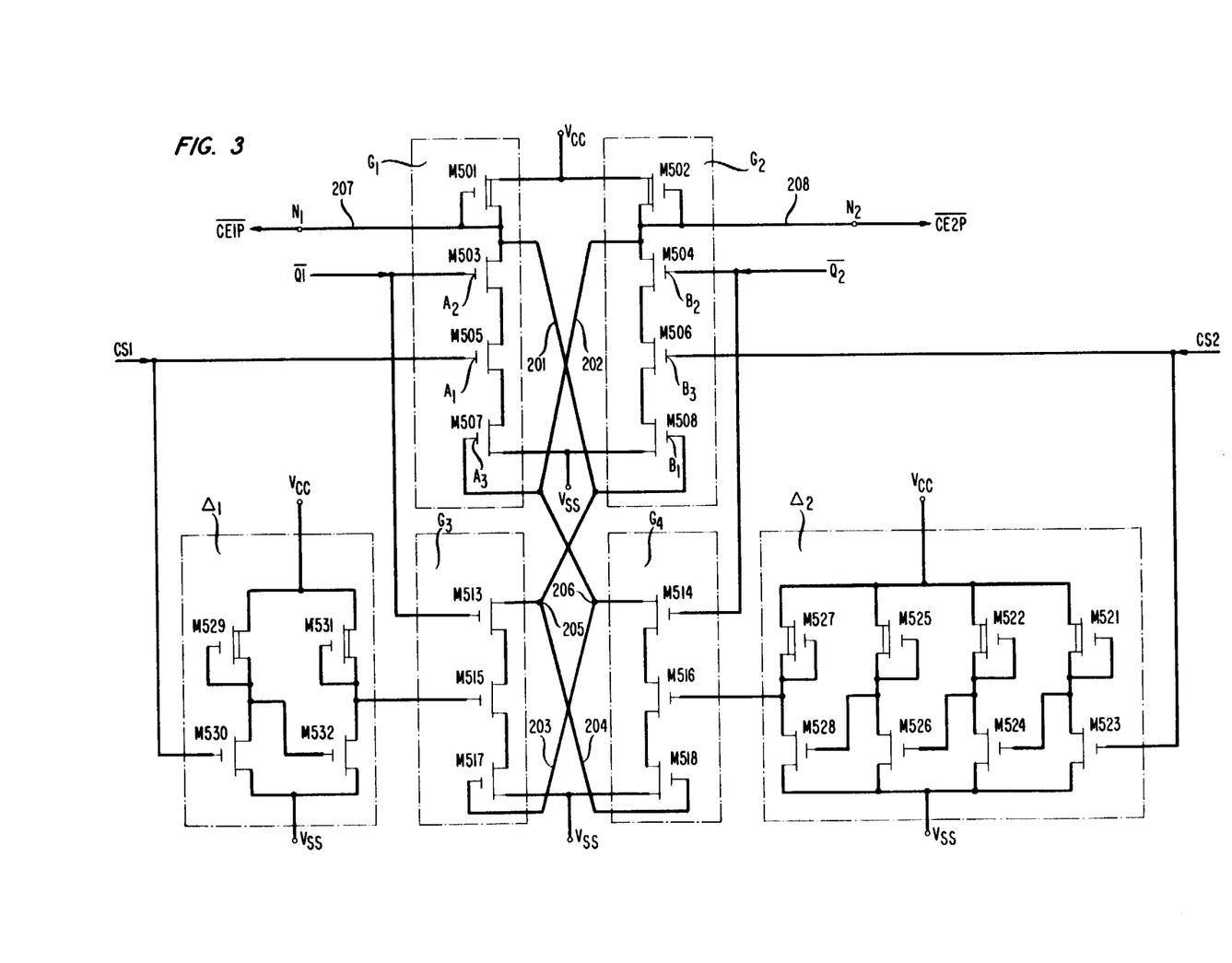
FIG. 3 is an illustrative schematic electrical circuit diagram of a central portion of the contention resolving electrical circuit shown in FIG. 2.

FIG. 3 is an illustrative schematic circuit diagram of a central portion of the contention resolving circuit 30 as diagrammed in FIG. 2. Transistors M501, M503, M505, and M507 form the main NAND gate $G_1$; whereas transistors M502, M504, M506, and M508 form the main NAND gate $G_2$. Transistors M513, M515, and M517 form the auxiliary NAND gate $G_3$; whereas transistors M514, M516, and M518 form the auxiliary NAND gate $G_4$. Transistors M529 through M532 form the first delay element $\Delta_1$; whereas transistors M521 through M528 form the second delay element $\Delta_2$.

Figure 4:
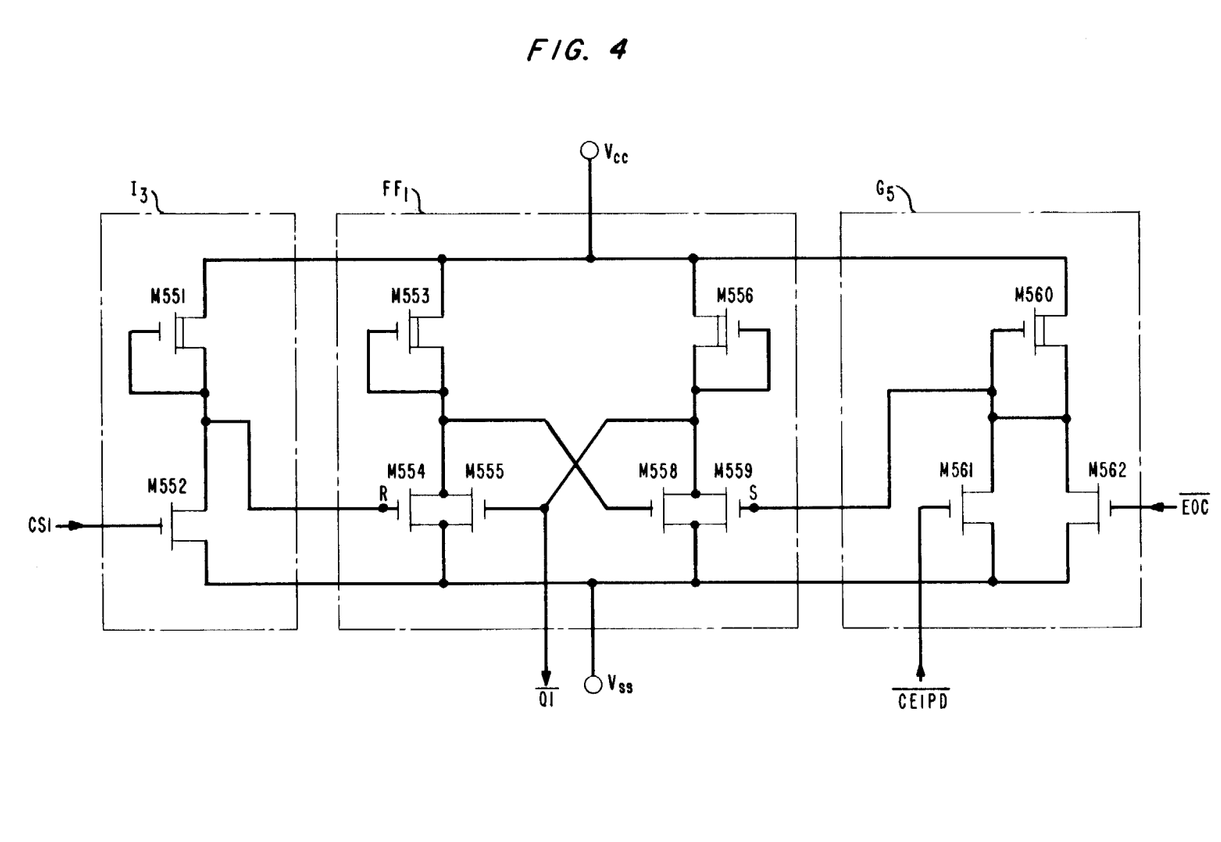
FIG. 4 is an illustrative schematic electrical circuit diagram of a peripheral portion of the contention resolving circuit shown in FIG. 2.

FIG. 4 is an illustrative schematic circuit diagram of the top portion of the contention resolving circuit 30 as diagrammed in FIG. 2. Transistors M551 and M552 form the inverter $I_3$; transistors M553 through M559 form the flip-flop $FF_1$; and transistors M560 through M562 form the NOR gate $G_5$.

In an illustrative example, all transistors in FIGS. 2-4 are N-MOS transistors with the following characteristics:

| Transistor | Channel Width to Length Ratio (W/L) | Threshold (Volts) |
|---|---|---|
| M533, M534 | 6/5 | −2.35 |
| M535, M536 | 25/3 | +0.60 |
| M501, M502 | 20/5 | −2.35 |
| M503–M508 | 80/3 | +1.15 |
| M513–M518 | 7/3 | +1.15 |
| M521, M525, M529 | 6/7 | −2.35 |
| M522, M527, M31 | 7/7 | −2.35 |
| M523, M524, M526, M528, M530, M532 | 10/3 | +1.15 |
| M551, M553 | 7/7 | −2.35 |
| M552, M554, M555 | 10/3 | +1.15 |
| M556, M560 | 9/7 | −2.35 |
| M558, M561 | 15/3 | +1.15 |
| M559 | 20/3 | +1.15 |

For example, a W/L ratio of 80/3 means that the width of the gate and source and drain (GASAD) diffusion is 80 micron and the length of the gate electrode is 3 micron. The resulting channel length, however, is somewhat less than the 3 micron, due to an extension by diffusion of the source and drain zones of about 0.5 micron under the gate electrode.

A contention resolving circuit using the above parameters has been built and tested, and has been found to operated properly.

In general, the transistors with threshold of −2.35 volts are depletion mode transistors, those of +1.15 volts are "high" threshold enhancement, and those of 0.60 volts are "low" threshold enhancement (commonly called "ordinary" enhancement).

Note that the value of W/L of M501 is substantially lower than that of M503, M505, M507 of $G_1$ but is substantially higher than that of M513, M515, and M517 of $G_3$. The transistor M501 acts as an inverting load both for $G_1$ and for $G_3$, so that both $G_1$ and $G_3$ operate as NAND gates. Note also that the resistance in series of the three "driver" transistors M513, M515, and M517 of $G_3$ is thus significantly higher than that of the three driver transistors M503, M505, and M507 of $G_1$, so that the current through $G_3$ (when all three of its driver transistors are ON) is significantly lower than the current through $G_1$ (when all three of its driver transistors are ON). Therefore, the voltage at node $N_1$ is pulled down significantly more by $G_1$ than by $G_3$, to the extent that when all three driver transistors in $G_1$ are ON, the voltage at node $N_1$ is pulled down below the turn-ON voltage of the cross-coupled transistor M504 of $G_2$, and hence this cross-coupled transistor is turned OFF by the turning ON of all three drivers of $G_1$ whether or not all three driver transistors of $G_3$ are then also ON. But, because of the relatively high resistance of the drivers M513, M515, and M517 of $G_3$, when all three of these driver transistors of $G_3$ are ON, the voltage at node $N_1$ is not pulled down below the turn-ON voltage of the cross-coupled transistor M504 of $G_2$ unless all three driver transistors in $G_1$ are then also ON. Thus, the OFF vs. ON condition of the cross-coupled transistor M504 of $G_2$ is controlled by the drivers of $G_1$ and not by the drivers of $G_3$—with one exception. That exception arises when the inputs CS1 and CS2 to the driver transistors M505 and M506 simultaneously shift from LOW to HIGH while the inputs Q1 and Q2 to the driver transistors M503 and M504 were and remain HIGH, so that just prior to the shift the voltages of both nodes $N_1$ and $N_2$ were HIGH (since both transistor M506 and M507 were earlier OFF): after the shift, all three driver transistors of $G_1$ and $G_2$ are ON, and the voltages of both nodes $N_1$ and $N_2$ are pulled downward. However, this downward pull of $N_1$ and $N_2$ extends to turn OFF the cross-coupled transistors M503 and M504, and thus prevents complete pull-down on $N_1$ and $N_2$ to $V_{SS}$, so that an intermediate state of the nodes $N_1$ and $N_2$ tends to result—a state analogous, for example, to the indeterminate state of an R-S flip-flop whose inputs to both its R and its S terminals simultaneously are HIGH. On the other hand, if after the above shift of the inputs from LOW to HIGH, which tends to produce the indeterminate state, all three driver transistors of $G_3$ but not of $G_4$ are ON, then the voltage of node $N_1$ is pulled downward more than that of node $N_2$, so that the intermediate state is resolved by the influence of $G_3$, whereby the node $N_1$ goes LOW and $N_2$ goes HIGH, and a stable state of nodes $N_1$ and $N_2$ is achieved.

In this way, $G_1$ and $G_2$ (FIG. 3) behave as cross-coupled NAND gates with relatively high output voltage level shifting capability, while $G_3$ and $G_4$ behave as cross-coupled NAND gates with relatively low output voltage level shifting capability.

Although the invention has been described in detail with reference to a specific embodiment, various modifications can be made without departing from the scope of the invention. For example, instead of N-channel MOS transistors, P-channel transistors, or NPN or PNP bipolar transistors, can be used. Moreover, the contention resolving circuit 30 can be used in contexts other than accessing a RAM. For example, the circuit 30 can be used for synchronizing a pair of asynchronous or random input signals (e.g., CS1 and CS2), that is, for producing output signals (e.g., CE1 and CE2) which are spaced apart in time by at least a predetermined time interval and which can then be multiplexed onto a single output line to a target circuit.

What is claimed is:

1. A circuit for producing a pair of contention resolved output signals from first and second conflicting access request signals comprising:
   (a) first and second cross-coupled, triple input main combinational logic elements each having an input terminal that is separately connected for receiving the first and second request signals, respectively;
   (b) first and second bistable logic elements each respectively connected for delivering to another separate input terminal of the first and second main logic elements, respectively, first and second priority status signals representative of the instantaneous priority of access status of the access request signals.

2. The circuit of claim 1 in which each of the main combinational logic elements (e.g., $G_1$, $G_2$) is a NAND gate.

3. The circuit of claim 1 further comprising:
   (a) first and second cross-coupled, triple input, auxiliary combinational logic elements (e.g., $G_3$, $G_4$), both having significantly weaker output driving strengths, respectively, than those of the first and second main logic elements (e.g., $G_1$, $G_2$), an output terminal, respectively, of the first and second auxiliary logic elements (e.g., $G_3$, $G_4$) being separately connected to the output terminal of the first and of the second main logic element (e.g., $G_1$, $G_2$), respectively, and an input terminal of the first and of the second auxiliary logic elements (e.g., $G_3$, $G_4$) being separately connected for receiving, respectively, the first and the second priority signals (e.g., Q1, Q2); and
   (b) first and second delay elements ($\Delta_1$, $\Delta_2$) having mutually different delay characteristics and being connected so as to deliver a differently delayed signal representative (CS1D, CS2DD) of the first and of the second access request signal (e.g., CS1=0, CS2=0), respectively, to an input terminal of the respective one of the first and the second auxiliary logic elements (e.g., $G_3$, $G_4$).

4. The circuit of claim 3 in which each of the auxiliary logic elements (e.g., $G_3$, $G_4$) is a NAND gate.

5. The circuit of claim 4 in which each of the main logic elements (e.g., $G_1$, $G_2$) is a NAND gate.

6. The circuit of claim 3 further comprising: first and second mutually cross-coupled gating elements each having a controlled path separately connected respectively to the output terminal of the first and second main logic elements, respectively.

7. The circuit of claim 6 in which each main and each auxiliary logic element is a NAND gate.

8. The arrangement of claim 7 in which:
   (a) each gating element comprises a transistor element;
   (b) each main logic element comprises a main triplet of input transistors whose controlled paths are mutually connected in series with a separate load element; and
   (c) each auxiliary logic element comprises an auxiliary triplet of input transistors whose controlled paths are mutually connected in series with a respective one of first and second nodes, each of the first and second nodes being separately connected to the output terminal of the first and second main logic elements, respectively.

9. The circuit of claim 1 or 3 further comprising:
   (a) third and fourth delay elements having substantially equal delay characteristics and separately connected for receiving the respective signals at first and second nodes, respectively, each of the first and second nodes being separately connected to the output terminal of the first and second main logic elements, respectively, for producing first and second delayed output signals representative of the respective signals at the first and second nodes, respectively, delayed by the third and fourth delay elements, respectively; and
   (b) first and second NOR gates, each having an output terminal separately connected to the set input terminal of a separate one of the flip-flops, each such NOR gate having a first input terminal separately connected for receiving a complementary end-of-cycle signal from target circuitry connected to receive the pair of contention resolved output signals, and each NOR gate having a second input terminal separately connected for receiving, respectively, the first and second delayed output signals, respectively.

10. The circuit of claim 2, 4, or 5 further comprising:
  (a) third and fourth delay elements, having substantially equal delay characteristics and separately connected for receiving the respective signals at first and second nodes, each of the first and second nodes being connected to the output terminal of the first and second main logic elements, respectively, for producing first and second delayed output signals representative of the respective signals at the first and second nodes, respectively; and
  (b) first and second NOR gates, each having an output terminal separately connected to the set input terminal of a separate one of the flip-flops, each such NOR gate having a first input terminal supplied with a complementary end-of-cycle signal from target circuitry connected for receiving the contention resolved output signals, and each such NOR gate having a second input terminal separately connected for receiving, respectively, the first and delayed output signals from the first and second nodes, respectively.

11. The circuit of claim 6 or 7 further comprising:
  (a) third and fourth delay elements, having substantially equal delay characteristics and separately connected for receiving the signals, respectively, at first and second nodes, each of the first and second nodes being separately connected to the output terminal of the first and second main logic elememts, respectively, for producing a first and a second delayed output signal representative of the respective signals at the first and second nodes, respectively; and
  (b) first and second NOR gates, each having an output terminal separately connected to the set input terminal of a separate one of the flip-flops, each NOR gate having a first input terminal supplied with a complementary end-of-cycle signal from target circuitry connected for receiving the contention resolve output signals, and each NOR gate having a second input terminal separately supplied with the first and the second delayed output signals, respectively, of the first and second nodes, respectively.

12. The circuit of claim 9 further comprising:
means (e.g., $I_3$, $I_4$) for separately delivering, to the reset input terminal (e.g., R) of a separate one of each of the flip-flops (e.g., $FF_1$, $FF_2$), a delayed signal (CS1D, CS2D) representative of delayed separate one of the conflicting access request signals (e.g., CS1, CS2).

13. The arrangement of claim 10 further comprising:
  (a) third and fourth delay elements, having substantially equal delay characteristics and separately supplied with the output of the first and second nodes, respectively, for producing a delayed output signal representative of output signal from the first and second nodes, respectively; and
  (b) first and second NOR gates, each having an output terminal separately connected to the set input terminal of a separate one of the flip-flops, each NOR gate having a first input terminal supplied with a complementary end-of-cycle signal of target circuitry connected for receiving the pair of contention resolved output signals, and each NOR gate having a second input terminal separately supplied with the delayed output signal of the first and second nodes, respectively.

14. The circuit of claim 11 further comprising:
  (a) third and fourth delay elements, having substantially equal delay characteristics and separately supplied with the output of the first and second nodes, respectively, for producing a delayed output signal representative of the respective signals at the first and second nodes, respectively; and
  (b) first and second NOR gates, each having an output terminal separately connected to the set input terminal of a separate one of the flip-flops, each NOR gate having a first input terminal supplied with a complementary end-of-cycle signal of target circuitry connected for receiving the contention resolved output signals, and each NOR gate having a second input terminal separately supplied with the delayed output signal of the first and second nodes, respectively.

15. A circuit, (e.g., 30) comprising:
  (a) first and second cross-coupled main combinational logic elements (e.g., $G_1$ and $G_2$) each having an output terminal separately connected, respectively, to a different one of first and second nodes (e.g., $N_1$ and $N_2$); and
  (b) third and fourth cross-coupled auxiliary combinational logic elements (e.g., $G_3$ and $G_4$) each having an output terminal separately connected, respectively, to a different one of the first and second nodes (e.g., $N_1$ and $N_2$), the output driving strengths of the third and fourth logic elements (e.g., $G_3$ and $G_4$) being significantly weaker, respectively, than those of the first and second logic elements (e.g., $G_1$ and $G_2$), an input terminal of both the first and of the third logic elements (e.g., $G_1$ and $G_3$) connected for receiving a first priority status signal (e.g., Q1), and an input terminal of both the second and fourth logic elements (e.g., $G_2$ and $G_4$) connected for receiving a second priority status signal (e.g., Q2).

16. The circuit of claim 15 in which the first and second logic elements (e.g., $G_1$ and $G_2$) are substantially identical.

17. The circuit according to claim 15 or 16 in which the third and fourth logic elements (e.g., $G_3$ and $G_4$) are substantially identical.

18. The circuit of claim 15 or 16 in which the first, second, third and fourth logic elements (e.g., $G_1$, $G_2$, $G_3$ and $G_4$) all have at least three input terminals.

19. The circuit of claim 18 in which another input terminal of the first and second logic elements (e.g., $G_1$ and $G_2$), respectively, is connected for receiving a first and a second access request signal (e.g., CS1 and CS2), respectively, and another input terminal of the third and fourth logic elements (e.g., $G_3$), respectively, is connected for receiving first and second differently delayed signal representative (e.g., CS1D and CS1DD), respectively, of first and second access request signals (e.g., CS1 and CS2)

20. The circuit of claim 18 further comprising a pair of cross-coupled output gates (e.g., M535, M536) each having a control terminal connected to a different one of the first and second nodes (e.g., $N_1$ and $N_2$).

21. The circuit of claim 19 further comprising first and second bistable logic elements (e.g., $FF_1$ and $FF_2$)

which provide, respectively, the first and second status signals (Q1 and Q2).

22. The circuit of claim 20 further comprising first and second bistable logic elements (e.g., FF$_1$ and FF$_2$) which provide, respectively, the first and second status signals (Q1 and Q2).

23. The circuit of claim 21 in which the first and second bistable logic elements (e.g., FF$_1$ and FF$_2$) are flip-flops, and which further comprises:
   (a) first and second NOR gates (e.g., G$_5$ and G$_6$) each having an output terminal connected, respectively, to the set input terminal (e.g., S) of the first and second flip-flips (e.g., FF$_1$ and FF$_2$), respectively, a first input terminal of each of the first and second NOR gates (e.g., G$_5$ and G$_6$) being connected for receiving a common end-of-cycle indicating signal (EOC), and a second input terminal of the first and second NOR gates (e.g., G$_5$ and G$_6$) being separately connected, respectively, for receiving first and second separately delayed signals (e.g., CE1P and CE2P) representative of the respective signals (e.g., CE1P and CE2P) developed at the first and second nodes (e.g., N$_1$ and N$_2$), respectively;
   (b) first and second time delay elements (e.g., Δ$_1$ and Δ$_2$) of differing time delays connected to provide, respectively, to input terminals of the third and fourth logic elements (e.g., G$_3$ and G$_4$), respectively, differently delayed signal representatives (e.g., CS1D and CS2DD) of the first and second access request signals (e.g., CS1 and CS2); and
   (c) a pair of inverting elements (e.g., I$_3$ and I$_4$) connected for providing to the reset input terminals of the first and second flip-flips (e.g., FF$_1$ and FF$_2$), respectively, first and second inverted signal representatives (e.g., CS1D and CS2D) of the first and second chip select inputs (e.g., CS1 and CS2), respectively.

24. A contention resolving circuit (e.g., 30) comprising:
   (a) first and second cross-coupled main combinational logic elements (e.g., G$_1$ and G$_2$) each having an output terminal separately connected, respectively, to a different one of first and second nodes (e.g., N$_1$ and N$_2$);
   (b) third and fourth cross-coupled auxiliary combinational logic elements (e.g., G$_3$ and G$_4$) each having an output terminal separately connected, respectively, to a different one of the first and second nodes (e.g., N$_1$ and N$_2$), the output driving strengths of the third and fourth logic elements (e.g., G$_3$ and G$_4$) being significantly weaker, respectively, than those of the first and second logic elements (e.g., G$_1$ and G$_2$); and
   (c) first and second bistable logic elements (e.g., FF$_1$, FF$_2$) each respectively connected for delivering to a separate input terminal (e.g., A$_2$, B$_2$) of the first and second main logic elements (e.g., G$_1$, G$_2$), respectively, first and second priority status signals (Q1, Q2) representative of the instantaneous priority of access status of the access request signals (e.g., CS1=0, CS2=0).

25. The circuit of claim 24 in which the combinational logic elements are NAND gates.

26. The circuit of claim 24 or 25 in which the bistable logic elements are flip-flop devices.

27. A dual port access enabling circuit comprising:
   (a) first and second cross-coupled combinational logic elements (e.g., G$_1$ and G$_2$);
   (b) third and fourth cross-coupled combinational logic elements (e.g., G$_3$ and G$_4$) of weaker driving strengths than those of the first and second logic elements, an output terminal of each of the third logic elements (e.g., G$_1$ and G$_3$) being connected to a first output node (e.g., N$_1$), an output terminal of each of the second and fourth logic elements (e.g., G$_2$ and G$_4$) being connected to a second output node (e.g., N$_2$), an input terminal of each of the first and second elements (e.g., G$_1$ and G$_2$) being connected for receiving, respectively, first and second access request signals, an input terminal of each of the third and fourth elements (e.g., G$_3$ and G$_4$) being connected for receiving, respectively, the first and second access request signals delayed by differing first and second amounts of time (e.g., Δ$_1$ and Δ$_2$), respectively; and
   (c) first and second bistable logic elements (e.g., FF$_1$ and FF$_2$) connected for sending to the first and second combinational logic elements (e.g., G$_1$ and G$_2$), respectively, first and second priority status signals (e.g., Q1 and Q2).

28. A contention resolving access circuit comprising:
   (a) first and second main gates (e.g., G$_1$, G$_2$) to be supplied respectively with first and second input signals (e.g., CS1, CS2) contending for access, designed so that the one main gate (say G$_1$) which happens to be supplied first in time with an input signal (say CS1=1) is selectively enabled; and
   (b) bistable means (e.g., G$_5$, FF$_1$) supplied with a signal (e.g., CE1PD) derived from an output signal (e.g., CE1P) of the selectively enabled gate (say G$_1$) for disabling the one gate (say G$_1$) immediately after lapse of a prescribed interval of time after it has been enabled and for immediately subsequently maintaining it disabled until the input signal (say CS1) to that gate (say G$_1$) terminates.

29. The circuit of claim 28 further comprising means (e.g., G$_3$, G$_4$) for selectively imbalancing the main gates (e.g., G$_1$, G$_2$) when the latter gates (e.g., G$_1$, G$_2$) tend toward an intermediate state caused by simultaneous initiation of the first and second input signals (e.g., CS1=CS2=1).

30. The circuit of claim 28 or 29 in which the main gates are cross-coupled.

31. A circuit for producing a pair of contention resolved output signals from first and second conflicting access requests signals, the circuit being connected for delivering the contention resolved output signals to target circuitry, comprising:
   (a) first and second cross-coupled, triple input main combinational logic elements each having an input terminal that is separately connected for receiving the first and second request signals, respectively;
   (b) first and second bistable logic elements each respectively connected for delivering to another separate input terminal of the first and second main logic elements, respectively, first and second priority status signals representative of the instantaneous priority of access status of the access request signals.

32. The circuit of claim 31 further comprising:
   (a) first and second cross-coupled, triple input, auxiliary combinational logic elements, both having significantly weaker output driving strengths, respectively, than those of the first and second main logic elements, an output terminal, respectively, of the first and second auxiliary logic elements being separately connected to the output terminal of the first and of the second main logic element, respectively, and an input terminal of the first and of the second auxiliary logic elements being separately connected for receiving, respectively, the first and the second priority signals; and (b) first and second delay elements having mutually different delay characteristics and being connected so as to deliver a differently delayed signal representative of the first and of the second access request signal, respectively, to an input terminal of the respective one of the first and the second auxiliary logic elements.

* * * * *

UNITED STATES PATENT AND TRADEMARK OFFICE
CERTIFICATE OF CORRECTION

PATENT NO. : 4,620,118

DATED : October 28, 1986

INVENTOR(S) : Frank E. Barber

It is certified that error appears in the above-identified patent and that said Letters Patent is hereby corrected as shown below:

Column 2, at each occurrence: "CS1" should read --$\overline{CS1}$--; "CS2" should read --$\overline{CS2}$--; "Q1" should read --$\overline{Q1}$--; "Q2" should read --$\overline{Q2}$--.

Column 3, at each occurrence: "EOC" should read --$\overline{EOC}$--; "Q1" should read --$\overline{Q1}$--; "Q2" should read --$\overline{Q2}$--; "CS1D" should read --$\overline{CS1D}$--; "CS2D" should read --$\overline{CS2D}$--; "CS1" should read --$\overline{CS1}$--(line 65 excluded); "CS2" should read --$\overline{CS2}$--; "CE1PD" should read --$\overline{CE1PD}$--; "CE2PD" should read --$\overline{CE2PD}$--.

Column 4, at each occurrence: "EOC" should read --$\overline{EOC}$--; "CE1PD" should read --$\overline{CE1PD}$--; "Q1" should read --$\overline{Q1}$--.

Column 5, at each occurrence: "CS1" should read --$\overline{CS1}$--; "CS2" should read --$\overline{CS2}$--; "EOC" should read --$\overline{EOC}$--.

Column 6, at each occurrence: "CS1" should read --$\overline{CS1}$-- (line 57 excluded); "CS2" should read --$\overline{CS2}$--; "EOC" should read --$\overline{EOC}$--; "CE1P" should read --$\overline{CE1P}$--.

Column 7, at each occurrence: "CE1P" should read --$\overline{CE1P}$--; "CE1PD" should read --$\overline{CE1PD}$--; "EOC" should read --$\overline{EOC}$--; "CS1D" should read --$\overline{CS1D}$--(line 18 excluded); "Q1" should read --$\overline{Q1}$--; "Q2" should read --$\overline{Q2}$--; "CS1" should read --$\overline{CS1}$--; "CS2" should read --$\overline{CS2}$--.

Column 8, at each occurrence: "CS1" should read --$\overline{CS1}$-- (lines 17, 57 excluded); "CS2" should read --$\overline{CS2}$--(line 19, second occurrence excluded);"Q1" should read --$\overline{Q1}$--; "CE2P" should read --$\overline{CE2P}$--; "CE1P" should read --$\overline{CE1P}$--; "CE1PD" should read --$\overline{CE1PD}$--; "EOC" should read --$\overline{EOC}$--.

UNITED STATES PATENT AND TRADEMARK OFFICE
CERTIFICATE OF CORRECTION

PATENT NO. : 4,620,118

DATED : October 28, 1986

INVENTOR(S) : Frank E. Barber

It is certified that error appears in the above-identified patent and that said Letters Patent is hereby corrected as shown below:

Column 9, at each occurrence: "CE1P" should read --$\overline{CE1P}$--; "Q1" should read --$\overline{Q1}$--; "CS1" should read --$\overline{CS1}$--(lines 34, 45 excluded); "EOC" should read --$\overline{EOC}$--; "CS2" should read --$\overline{CS2}$--(lines 26, second occurrence, 45 excluded); "CS2D" should read --$\overline{CS2D}$--; "Q2" should read --$\overline{Q2}$--; "CS1D" should read --$\overline{CS1D}$--; "CE1PD" should read --$\overline{CE1PD}$--.

Column 10, at each occurrence: "Q1" should read --$\overline{Q1}$--; line 28, "$\overline{CS1D}$" should read --CS1D--; line 30, "$\overline{CS1DD}$" should read --CS1DD--; "Q2" should read --$\overline{Q2}$--; "EOC" should read --$\overline{EOC}$--; line 65, "N=0" should read --$N_1=0$--.

Column 11, at each occurrence: "CS1" should read --$\overline{CS1}$--; "CS2" should read --$\overline{CS2}$--; "Q1" should read --$\overline{Q1}$--; "Q2" should read --$\overline{Q2}$--; "CE1P" should read --$\overline{CE1P}$--; "CE2P" should read --$\overline{CE2P}$--; line 35, "CS1P" should read --$\overline{CE1P}$--; line 36, "CS2P" should read --$\overline{CE2P}$--; "EOC" should read --$\overline{EOC}$--.

Column 13, at each occurrence: "Q1" should read --$\overline{Q1}$--; "Q2" should read --$\overline{Q2}$--; "CS1" should read --$\overline{CS1}$-- (line 9 excluded); "CS2" should read --$\overline{CS2}$-- (line 9 excluded).

Column 14, at each occurrence: "Q1" should read --$\overline{Q1}$--; "Q2" should read --$\overline{Q2}$--; "CS1" should read --$\overline{CS1}$--; "CS2" should read --$\overline{CS2}$--.

Column 15, at each occurrence: "CS1D" should read --$\overline{CS1D}$--; "CS2D" should read --$\overline{CS2D}$--; "CS1" should read --$\overline{CS1}$--; "CS2" should read --CS2--.

Column 16, at each occurrence: "Q1" should read --$\overline{Q1}$--; "Q2" should read --$\overline{Q2}$--.

UNITED STATES PATENT AND TRADEMARK OFFICE
CERTIFICATE OF CORRECTION

PATENT NO. : 4,620,118
DATED : October 28, 1986
INVENTOR(S) : Frank E. Barber

It is certified that error appears in the above-identified patent and that said Letters Patent is hereby corrected as shown below:

Column 17, at each occurrence: "Q1" should read --$\overline{Q1}$--; "Q2" should read --$\overline{Q2}$--; "EOC" should read --$\overline{EOC}$--; "CE2P" should read --$\overline{CE2P}$--; "CE1P" should read --$\overline{CE1P}$--; "CS1D" should read --$\overline{CS1D}$-- (line 29 excluded); "CS2D" should read --$\overline{CS2D}$--; "CS1" should read --$\overline{CS1}$-- (lines 30, 36 excluded); "CS2" should read --$\overline{CS2}$-- (lines 30, 36 excluded).

Column 18, at each occurrence: "Q1" should read --$\overline{Q1}$--; "Q2" should read --$\overline{Q2}$--; "CE1PD" should read --$\overline{CE1PD}$--; "CE1P" should read --$\overline{CE1P}$--.

Signed and Sealed this

Third Day of May, 1988

Attest:

DONALD J. QUIGG

Attesting Officer

Commissioner of Patents and Trademarks